United States Patent

Loc et al.

[11] Patent Number: 5,944,302
[45] Date of Patent: Aug. 31, 1999

[54] LINEAR COMPRESSOR INCLUDING RECIPROCATING PISTON AND MACHINED DOUBLE-HELIX PISTON SPRING

[75] Inventors: Anthony S. Loc, Alhambra; Gerald R. Pruitt, San Pedro, both of Calif.

[73] Assignee: Raytheon Company, El Segundo, Calif.

[21] Appl. No.: 08/380,223

[22] Filed: Jan. 26, 1995

Related U.S. Application Data

[63] Continuation of application No. 08/046,542, Apr. 13, 1993, abandoned.

[51] Int. Cl.$^6$ .................................. F16F 1/02; F16F 1/04
[52] U.S. Cl. ............................................................. 267/180
[58] Field of Search .................................... 267/180, 188, 267/167, 166, 179, 174; 417/417

[56] References Cited

U.S. PATENT DOCUMENTS

| | | | |
|---|---|---|---|
| 2,049,936 | 8/1936 | Zimmer | 267/180 |
| 2,447,319 | 8/1948 | Fourchambault | 267/180 |
| 2,875,779 | 3/1959 | Campbell | 267/180 |
| 3,588,291 | 6/1971 | Curwen et al. | 417/417 |

FOREIGN PATENT DOCUMENTS

| | | |
|---|---|---|
| A-0 494 653 | 7/1992 | European Pat. Off. . |
| C-63 263 | 11/1891 | Germany . |
| A-40 33 945 | 5/1992 | Germany . |
| WO-A-92 12358 | 7/1992 | Germany . |
| 0209239 | 9/1987 | Japan ..................................... 267/167 |
| A-62 209 239 | 2/1988 | Japan . |
| 92/12358 | 7/1992 | WIPO ..................................... 267/180 |

OTHER PUBLICATIONS

S. Horn et al., Advances in Cryogenic Engineering, vol. 19, paper F–3, Pneumatically Driven Split–Cycle Cryogenic Refrigerator, pp. 216–220, 1974.

*Primary Examiner*—Matthew C. Graham
*Attorney, Agent, or Firm*—Colin M. Raufer; Leonard A. Alkov; Glenn H. Lenzen, Jr.

[57] ABSTRACT

A linear compressor (60) includes a reciprocating piston (20) for varying the volume of a compression chamber (12). A moving coil motor (26) causes the piston (20) to reciprocate against the force of an integrally machined double-helix spring (62) about a position in which the spring (62) is in a free state. The spring (62) includes a retainer (72) which is attached to the piston (20), a fixed flange (66) and two resilient helical members (78,80) which extend between the flange (66) and retainer (72) along a longitudinal axis (82). The helical members (78,80) are configured such that lateral reaction forces thereof are mutually canceling. The helical members (78,80) have the same twist direction, are interspersed with each other along the longitudinal axis (82) and are rotationally displaced from each other about the longitudinal axis (82) by substantially 180°. Alternatively, a spring (90) includes helical members (100,102) which have opposite twist directions and are spaced from each other along a longitudinal axis (104), and are interconnected at their inner ends by a center member (106).

10 Claims, 3 Drawing Sheets

LINEAR COMPRESSOR INCLUDING RECIPROCATING PISTON AND MACHINED DOUBLE-HELIX PISTON SPRING

This is a continuation application Ser. No. 08/046,542, filed Apr. 13, 1993, abandoned.

BACKGROUND OF THE INVENTION

1. Field of the Invention

The present invention generally relates to the art of reciprocating piston assemblies, and more specifically to a linear compressor including a reciprocating piston and an integrally machined double-helix piston spring which exerts substantially no lateral reaction force on the piston.

2. Description of the Related Art

A linear compressor including a double-opposed piston assembly is known in the art per se and used for generating a pulsating pressure which is applied to reciprocate a displacer piston in a Stirling cycle cooler as described in a publication entitled "ADVANCES IN CRYOGENIC ENGINEERING, Vol. 19, paper F-3 entitled "PNEUMATICALLY DRIVEN SPLIT-CYCLE CRYOGENIC REFRIGERATOR", by S. Horn et al, pp. 216–220.

The linear compressor is illustrated in FIG. 1 and designated as 10. A variable compression chamber 12 is defined within a housing 14 by cylinders 16 and 18 which are joined at their inner ends. Pistons 20 and 22 are slidable in the cylinders 16 and 18 for movement toward and away from the center of the compression chamber 12 and movably define the longitudinal ends of the compression chamber 12.

The pistons 20 and 22 are reciprocated by linear moving coil motors 26 and 28 respectively in a synchronized manner. More specifically, the motors 26 and 28 move the pistons 20 and 22 respectively toward the center of the compression chamber 12 together and away from the center of the compression 12 together in symmetrical reciprocating movements. Movement of the pistons 20 and 22 toward the center of the compression chamber 12 causes the pressure therein to increase, and vice-versa.

The compression chamber 12 is connected to a load such as a regenerator of a cryogenic cooler (not shown) through an outlet 24. The compression chamber 12, outlet 24, regenerator and interconnecting conduit are filled with a working gas such as helium such that reciprocation of the pistons 20 and 22 causes the working gas pressure to pulsate which in turn causes a piston in the regenerator to reciprocate and generate a thermodynamic Stirling cycle which causes absorption of heat from the cooled end and rejection of heat from the other end of the regenerator.

The motor 26 includes a generally cup-shaped armature 30 which is fixed to the piston 20 for integral movement. A coil 32 is wound around the armature 30 and connected to an electronic drive unit (not shown) by a lead 34. An annular permanent magnet 36 is fixed to the inner surface of the housing 14 radially outward of the coil 32. A helical spring 38 has a left end fixed to the left end of the housing 14 and a right end attached to the armature 30.

The piston 20, armature 30 and spring 36 are illustrated a central position in which the spring 38 is in a free state. An alternating current electrical drive signal is applied to the coil 32 through the lead 34 which causes the coil 32 to produce a magnetic field through the electromagnetic effect.

When the drive signal has a first polarity, the magnetic fields of the coil 32 and magnet 36 have relative polarities such that the coil 32, armature 30 and piston 20 are moved rightwardly toward the center of the compression chamber 12 to increase the pressure therein. This causes the spring 38 to extend and exert a force on the armature 30, piston 20 and coil 32 which urges them to return to the central illustrated position.

Reversal of the polarity of the drive signal causes the armature 30, piston 20 and coil 32 to move leftwardly away from the center of the compression chamber 12 to a position which is leftward of the center position to decrease the pressure in the compression chamber 12. This causes the spring 38 to compress and exert a force on the armature 30, piston 20 and coil 32 which urges them to return to the central illustrated position. The cycle is repeated periodically to produce a pulsating pressure in the compression chamber 12 and interconnected elements.

The motor 28 includes an armature 40, coil 42, lead 44, permanent magnet 46 and spring 48 which are identical to the corresponding elements of the motor 26. The illustrated configuration is known in the art as a "moving coil" design since the coils 32 and 42 move relative to the fixed magnets 36 and 46. However, equivalent results can be obtained by mounting permanent magnets on the armatures 30 and 40 and fixed coils on the housing 14 to provide a "moving magnet" design.

The springs 38 and 48 are typically formed of round spring wire stock in a single helical arrangement as illustrated in FIGS. 2 and 3. The problem with the springs 38 and 48 in a reciprocating piston assembly such as in the compressor 10 is that the springs 38 and 48 exert lateral reaction forces on the pistons 20 and 22 which cause them to wear from their original straight cylindrical shape into a barrel shape.

This causes the seals between the pistons 20 and 22 and the cylinders 16 and 18 respectively to degenerate, the pressure ratio of the compressor 10 to progressively decrease, and the operating lifetime of the compressor 10 to be substantially reduced.

More specifically, the spring 38 has left and right ends 38a and 38b respectively as illustrated in FIG. 2. When the spring 38 is extended, it generates a lateral reaction force which is directed out of the end 38a as indicated by an arrow 50 in FIG. 3. When the spring 38 is compressed, it generates a lateral reaction force which is directed into the end 38a, or opposite to the direction of the arrow 50.

The lateral reaction forces at the end 38b of the spring 38 are equal and opposite to those at the end 38a. These alternating forces cause the piston 20 to wear into a barrel shape as described above. The spring 48 generates essentially similar reaction forces which cause wear of the piston 22.

As viewed in FIG. 1, the left end portion of the spring 38 is fixed to the left end of the housing 14 by an annular flange 52, whereas the right end portion of the spring 38 is fixed to the armature 30 by an annular retainer 54. Although not illustrated in detail, the flange 52 is fastened to the left end of the housing 14 by screws or the like, whereas the radially inner surface of the flange 52 is threaded. The left end portion of the spring 38 is screwed into the inner threads of the flange 52 and thereby fixedly attached thereto.

The retainer 54 is fastened to the armature 30 by screws or the like, whereas the radially outer surface of the retainer 54 is threaded. The right end portion of the spring 38 is screwed onto the outer threads of the retainer 54 and thereby fixedly attached thereto. The spring 48 is similarly attached to the housing 14 and armature 40 by a flange 56 and retainer 58 respectively.

The prior art arrangement is disadvantageous in that each spring assembly consists of three components: a spring 38,48, a flange 52,56 and a retainer 54,58. The components must be manufactured separately and assembled, which is expensive and labor intensive. In addition, the springs 38 and 48 rub against the mating surfaces of the flanges 52 and 56 and retainers 54 and 58 respectively as the springs 38 and 48 are extended and compressed, generating noise and vibration during operation of the compressor 10 and causing fretting corrosion and wear of the spring.

SUMMARY OF THE INVENTION

A linear compressor embodying the present invention includes a reciprocating piston assembly for varying the volume of a compression chamber. A moving coil motor causes the piston to reciprocate against the force of an integrally machined double-helix spring about a position in which the spring is in a free state.

The spring includes a first end member which is attached to the piston, a fixed second end member and two resilient helical members which extend between the end members along a longitudinal axis.

The helical members may have the same twist direction, be interspersed with each other along the longitudinal axis and be rotationally displaced from each other about the longitudinal axis by approximately 180°.

Alternatively, the helical members may have opposite twist directions, be spaced from each other along the longitudinal axis and be interconnected at their inner ends by a center member.

The helical members are configured such that the lateral reaction forces thereof are mutually canceling. Since the spring does not exert any lateral forces on the piston, the piston will not wear into a barrel shape and progressively decrease the pressure ratio of the compressor.

The weight of the piston is a significant contributing factor to its rate of wear. The present spring has substantially greater lateral stiffness than the prior art spring, and supports part of the piston's weight. This reduces the load exerted by the piston on the cylinder and further reduces the wear. Thus, the operating lifetime of the present compressor is substantially increased over the prior art.

The spring is machined from high fatigue strength cylindrical or tubular stock as an integral unit, with the end members enabling the spring to be attached to the piston and to a fixed member at its opposite ends respectively. This eliminates the necessity of manufacturing a spring, flange and retainer as separate components and subsequently assembling them as in the prior art. The manufacturing cost and assembly labor are thereby reduced.

In addition, the rubbing between the spring, flange and retainer which occurs in the prior art compressor is eliminated, since these members are integral in the present invention. The noise and vibration generated by the rubbing are thereby eliminated.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 4:
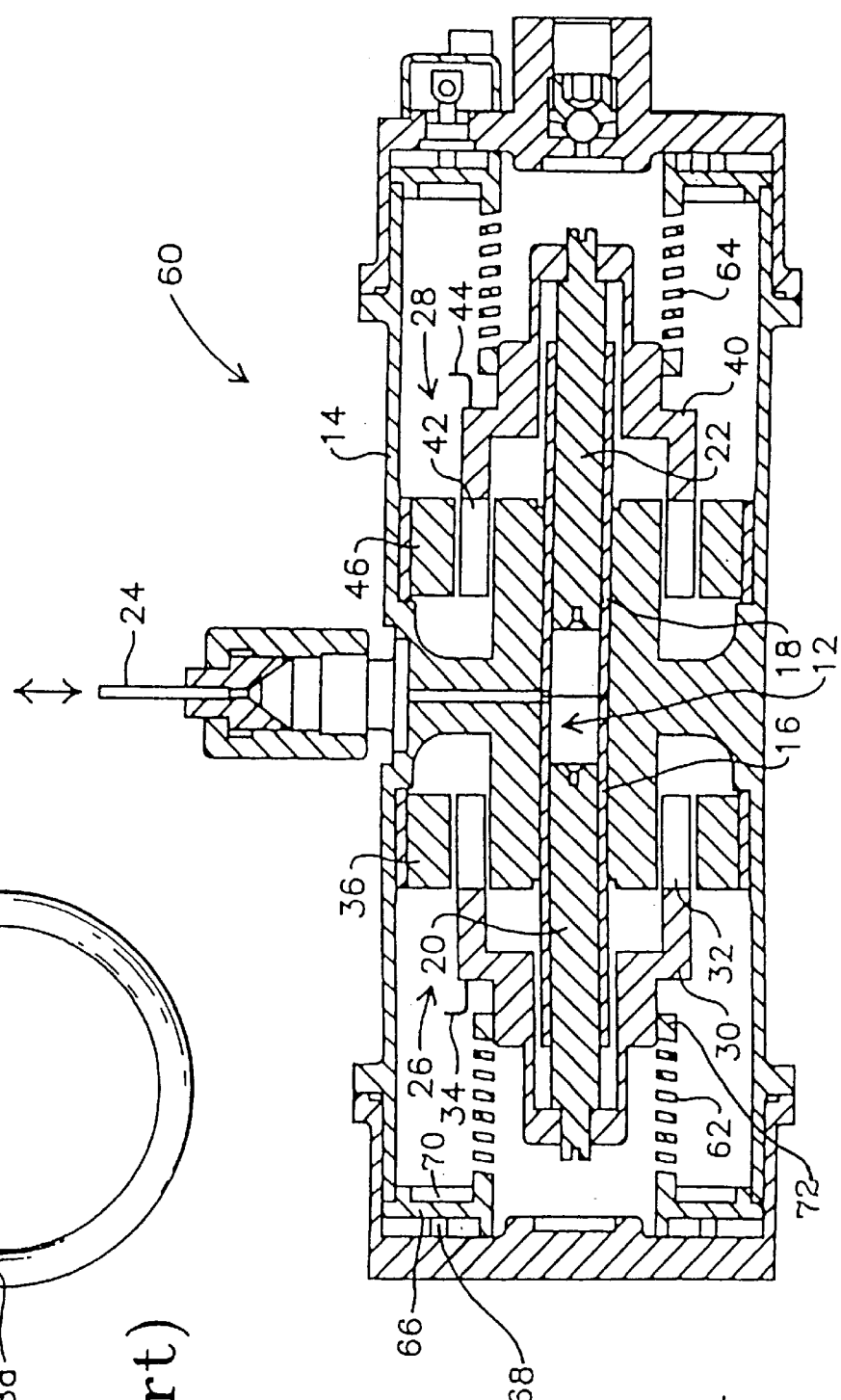
FIG. 4 is a longitudinal sectional view illustrating a prior art double-opposed piston linear compressor including a reciprocating piston assembly and integrally machined double-helix springs embodying the present invention.
Figure 5:
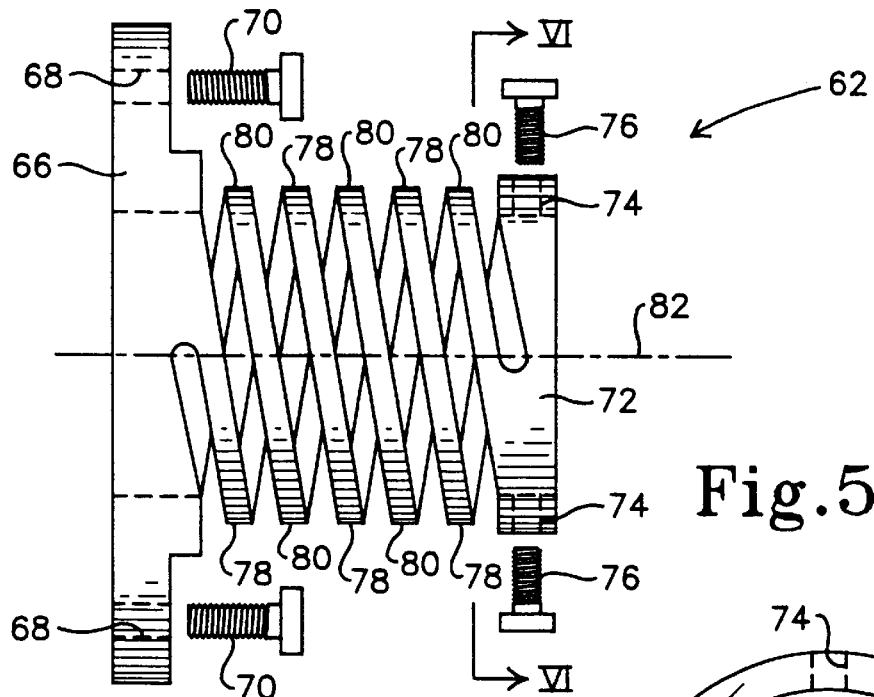
FIG. 5 is a side elevational view illustrating a double-helix spring of the compressor of FIG. 4.
Figure 6:
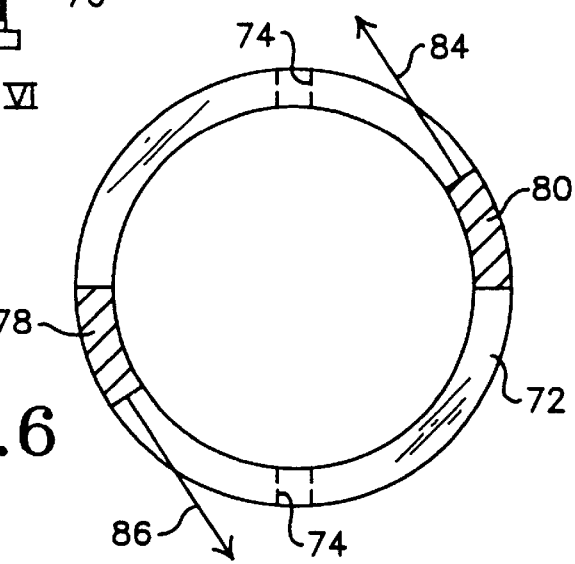
FIG. 6 is a sectional view taken on a line VI—VI of FIG. 5.

FIG. 4 illustrates a double-opposed linear compressor embodying the present invention which is generally designated as 60 and includes elements of the prior art compressor 10 which are designated by the same reference numerals. The compressor 60 differs from the compressor 10 in that the springs 38 and 48, flanges 52 and 56 and retainers 54 and 58 are replaced by integrally machined double-helix springs 62 and 64 according to the present invention respectively. The spring 62 is illustrated in FIGS. 5 and 6. The spring 64 is identical to the spring 62 and is not illustrated in detail.

The spring 62 includes an end portion which is shaped as an annular flange 66 and is formed with longitudinally extending holes 68 which enable the flange 66 to be fastened to the left end of the housing 14 of the compressor 60 by screws 70. The spring 62 further includes an end portion which is shaped as an annular retainer 72 and is formed with radially extending holes 74 which enable the retainer 72 to be fastened to the left end portion of the armature 30 of the compressor 60 by screws 76.

First and second resilient helical members 78 and 80 extend between the flange 66 and retainer 72 along a longitudinal axis 82 of the spring 62. The helical members 78 and 80 have the same twist direction and are substantially identical, and are interspersed with each other along the longitudinal axis 82. However, the members 78 and 80 are rotationally displaced from each other about the longitudinal axis 82 by substantially 180°.

The helical member 78 has a left end which is joined to or "starts from" the flange 66 at a position which is diametrically opposed to (rotationally displaced by 180° from) a position at which a left end of the helical member 80 starts from the flange 66. Similarly, the helical member 78 has a right end which starts from the retainer 72 at a position which is diametrically opposed to a position at which the right end of the helical member 80 starts from the retainer 72.

Figures 1, 2:
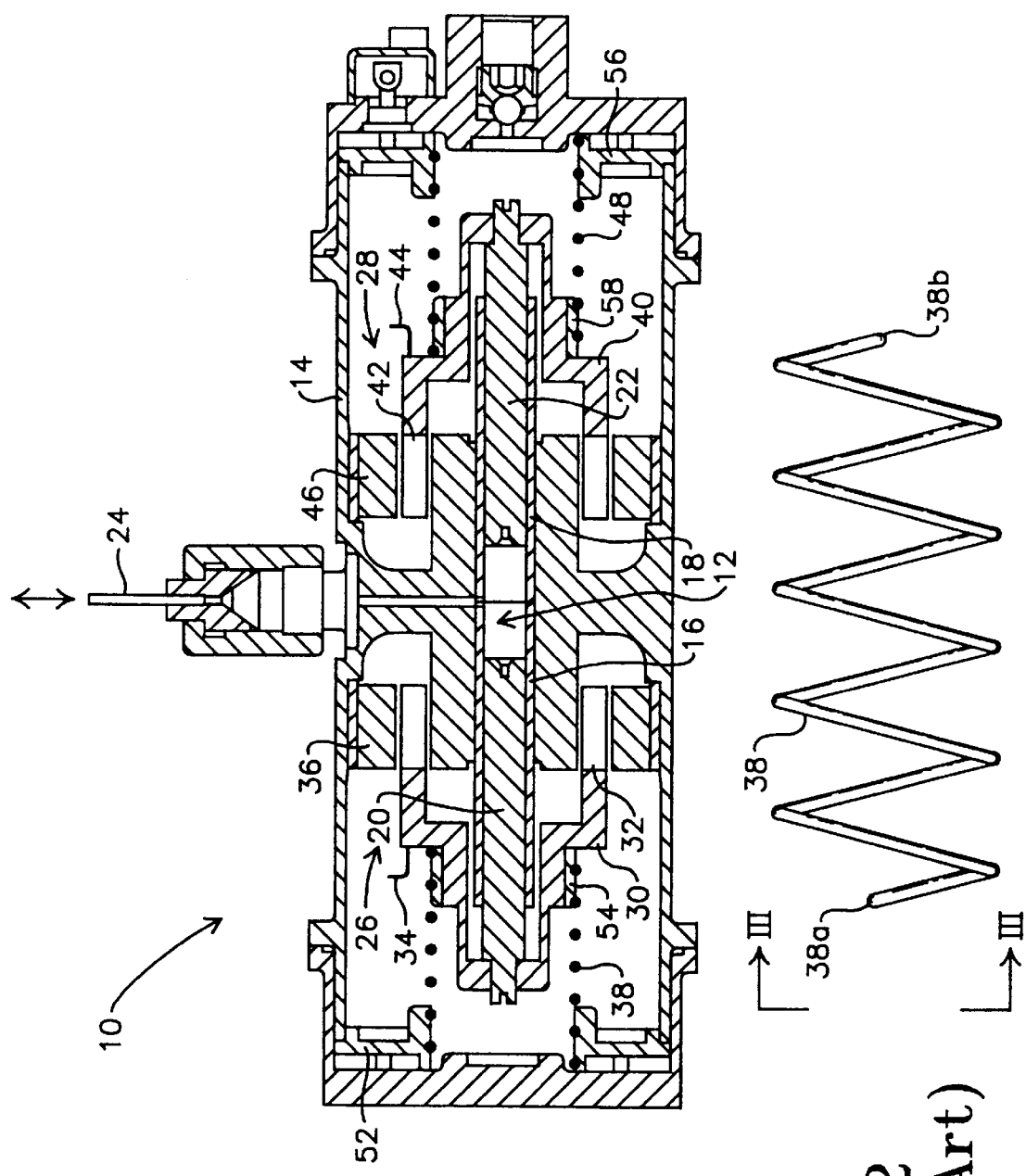
FIG. 1 is a longitudinal sectional view illustrating a prior art double-opposed piston linear compressor.
FIG. 2 is a side elevation illustrating a helical spring of the compressor of FIG. 1.
Figure 3:
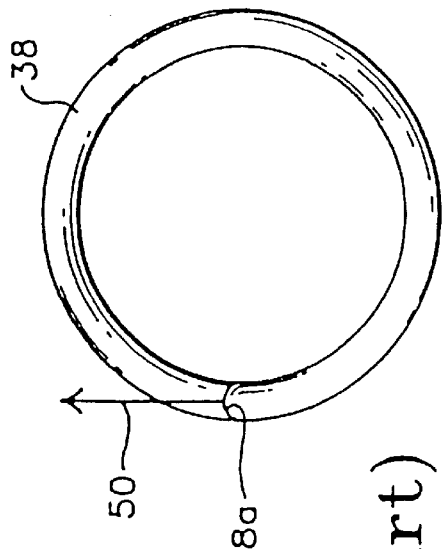
FIG. 3 is an elevational view illustrating the left end of the spring of FIG. 2.

Each of the helical members 78 and 80 generates lateral reaction forces such as illustrated with reference to FIG. 3. However, since the helical members 78 and 80 have the same twist direction and start from the flange 66 and retainer 72 at diametrically opposed positions, the lateral reaction forces of the helical members 78 and 80 are mutually canceling.

As illustrated in FIG. 6, when the spring 62 is extended, the helical member 80 will generate a lateral reaction force in the direction of an arrow 84, whereas the helical member 78 will generate a lateral reaction force in the direction of an arrow 86. The arrows 84 and 86 are parallel to each other and extend in opposite directions. Thus, the net lateral force parallel to the arrows 84 and 86 is zero.

Since the springs 62 and 64 do not exert lateral forces on the pistons 20 and 22 respectively, the pistons 20 and 22 will not wear into a barrel shape and progressively decrease the pressure ratio of the compressor 60.

The weight of the piston is a significant contributing factor to its rate of wear. The present spring has substantially greater lateral stiffness than the prior art spring, and supports part of the piston's weight. This reduces the load exerted by the piston on the cylinder and further reduces the wear. Thus, the operating lifetime of the compressor 60 is substantially increased over the prior art.

The springs 62 and 64 are manufactured as integral units, with the flanges and retainers enabling the springs 62 and 64 to be attached to the pistons 20 and 22 and to opposite ends of the housing 14. This eliminates the necessity of manufacturing a spring, flange and retainer as separate components and subsequently assembling them as in the prior art. The manufacturing cost and assembly labor are thereby reduced.

In addition, the rubbing between the spring, flange and retainer which occurs in the prior art compressor is eliminated, since these members are integral in the present invention. The noise, vibration and fretting corrosion of the spring caused by the rubbing are thereby eliminated.

The springs 62 and 64 are integrally machined from high fatigue strength cylindrical or tubular stock. Suitable materials include Carpenter Custom 455 Stainless Steel manufactured by Carpenter Technology Corp. of Reading, Pa., RMI 38-6-44 Titanium Beta Alloy, manufactured by RMI Co. of Niles, Ohio and Vascomax Nickel Maraging Steel C-300 manufactured by Vasco-Pacific of Montebello, Calif.

The springs 62 and 64 can be advantageously machined using a milling process, which produces the helical members 78 and 80 in a rectangular or square cross-section. More specifically, the milling cutter (not shown) is positioned with its rotary axis perpendicular to the longitudinal axis of the stock from which the spring 62 or 64 is to be fabricated.

To cut each helical member, the cutter is bored into the stock to the proper depth, and the stock is simultaneously translated along its longitudinal axis and rotated about its longitudinal axis at relative rates which correspond to the pitch of the helical members 78 and 80.

If the stock is tubular, the cutter is bored completely through the wall of the stock to cut the helical members 78 and 82. If the stock is initially cylindrical, it is converted to tubular by drilling a central bore, preferably before milling the helical members 78 and 80. The flange 66 and retainer 72 can be machined before or after milling the helical members 78 and 80.

Figure 7:
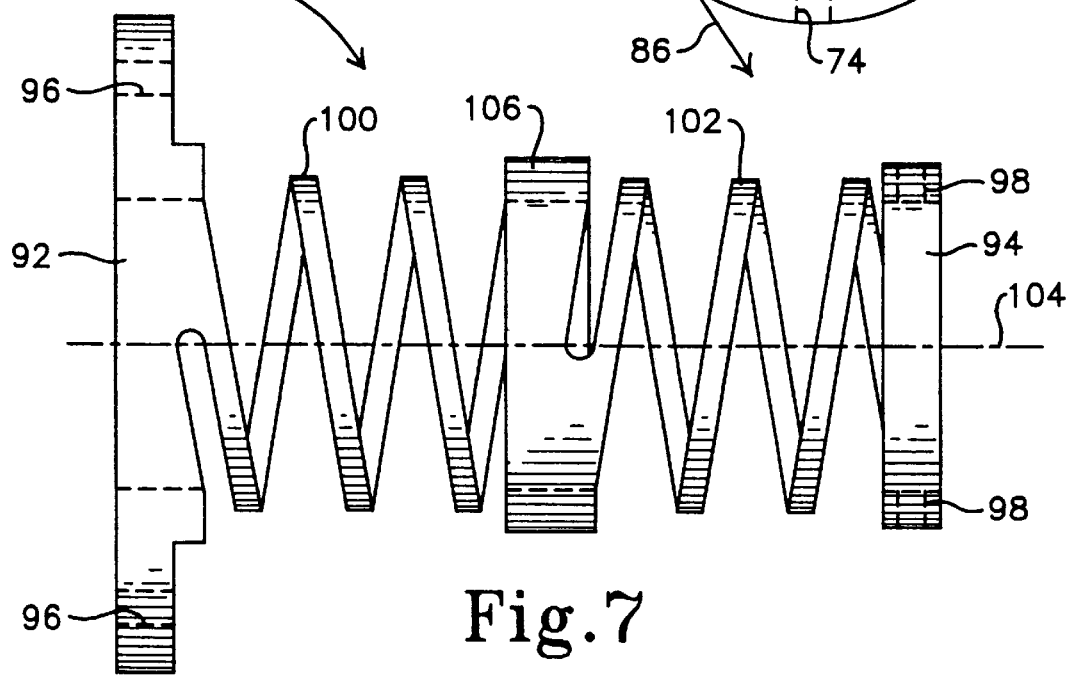
FIG. 7 is a side elevational view illustrating another embodiment of a double-helix spring according to the invention.

The helical members 78 and 80 of the springs 62 and 64 have the same twist and are mechanically connected in parallel. FIG. 7 illustrates a double-helix spring 90 which can be used instead of the springs 62 and 64 in applications in which longer springs are acceptable.

The spring 90 includes a flange 92 and a retainer 94 which are essentially similar to the flange 66 and retainer 72 of the spring 62. The flange 92 is formed with screw holes 96, whereas the flange 94 is formed with screw holes 98. The spring 90 further includes resilient helical members 100 and 102 which are spaced from each other along a longitudinal axis 104, and therefore mechanically connected in series. The inner ends of the helical members 100 and 104 are joined by an annular center member 106.

The helical members 100 and 102 are symmetrical and have opposite twist directions, resulting in mutual cancellation of lateral reaction forces in a manner similar to the springs 62 and 64. A lateral reaction force at each end of the helical member 100 is canceled by an equal and opposite lateral reaction force at a corresponding end of the helical member 102 and vice-versa.

While several illustrative embodiments of the invention have been shown and described, numerous variations and alternate embodiments will occur to those skilled in the art, without departing from the spirit and scope of the invention.

The compressor 60 is described and illustrated as having a double-opposed design including two piston and spring assemblies, as this provides low vibration without the necessity of a counterbalancing arrangement. However, a compressor of the invention can be embodied as including only a single piston and spring assembly if such is more suitable for a particular application.

The springs 62 and 90 are illustrated as including a flange at one end and a retainer at the other end. However, the invention is not so limited, and the springs can have their ends formed into any configuration suitable for fastening, for example, flanges at both ends.

It is also within the scope of the invention for the present integrally machined double-helix springs to find utility in applications other than compressors and piston assemblies.

Accordingly, it is intended that the present invention not be limited solely to the specifically described illustrative embodiments. Various modifications are contemplated and can be made without departing from the spirit and scope of the invention as defined by the appended claims.

I claim:

1. A linear compressor, comprising:
   a housing including a cylinder that defines a compression chamber therein having a variable volume;
   a piston slidable located in the cylinder for varying said volume of the compression chamber;
   a motor connected to one end of the piston for causing the piston to reciprocate in the cylinder; and
   an integral double-helix spring, including:
      a first end member which is attached to the motor and supports the piston;
      a second end member fixed to the housing; and
      first and second resilient helical members which extend between the first and second end members along a longitudinal axis and are responsive to the reciprocating piston.

2. A compressor as in claim 1, in which the motor causes the piston to reciprocate about a position in which the spring is in a free state.

3. A compressor as in claim 1, in which the first and second helical members have the same twist direction, are interspersed with each other along said longitudinal axis and are rotationally displaced from each other about said longitudinal axis by substantially 180°.

4. A compressor as in claim 3, in which the first and second helical members are substantially identical.

5. A compressor as in claim 1, in which the first and second helical members have opposite twist directions respectively and are connected in series and spaced from each other along said longitudinal axis.

6. A compressor as in claim 5, in which the first and second helical members are substantially symmetrical.

7. A compressor as in claim 5, further comprising a center member which is integral with and disposed between the first and second helical members.

8. The linear compressor of claim 1, wherein the first and second helical members are configured to have mutually canceling lateral reaction forces when the motor causes the piston to reciprocate against a force of the spring.

9. A linear compressor, comprising:

a housing including a cylinder that defines a compression chamber therein having a variable volume;

a piston slidable located in the cylinder for varying said volume of the compression chamber;

a motor connected to one end of the piston for causing the piston to reciprocate in the cylinder; and an integral double-helix spring, including:
a first end member which is attached to the motor and supports the piston,
a second end member fixed to the housing, and
first and second resilient helical members which extend between the first and second end members along a longitudinal axis,
wherein the first and second helical members have the same twist direction, are interspersed with each other along the longitudinal axis and are rotationally displaced from each other about the longitudinal axis by substantially 180° from the first end member to the second end member such that lateral reaction forces thereof on the piston are mutually canceling to minimize barrel shaped piston wear and loss of compression ratio when the motor causes the piston to reciprocate against a force of the spring.

10. A linear compressor, comprising:

a housing including a cylinder that defines a compression chamber therein having a variable volume;

a piston slidable located in the cylinder for varying said volume of the compression chamber;

a motor connected to one end of the piston for causing the piston to reciprocate in the cylinder; and an integral double-helix spring, including:
a first end member which is attached to the motor and supports the piston,
a second end member fixed to the housing, and
first and second resilient helical members which extend between the first and second end members along a longitudinal axis,
wherein the first and second helical members have opposite twist directions respectively and are connected in series and spaced from each other along said longitudinal axis such that lateral reaction forces thereof on the piston are mutually canceling to minimize barrel shaped piston wear and loss of compression ratio when the motor causes the piston to reciprocate against a force of the spring.

* * * * *